United States Patent
Tall et al.

(10) Patent No.: US 9,961,258 B2
(45) Date of Patent: May 1, 2018

(54) ILLUMINATION SYSTEM SYNCHRONIZED WITH IMAGE SENSOR

(71) Applicant: Facebook, Inc., Menlo Park, CA (US)

(72) Inventors: Martin Henrik Tall, Frederiksberg C. (DK); Sebastian Sztuk, Copenhagen (DK); Javier San Agustin Lopez, Copenhagen S (DK); Rasmus Dahl, Copenhagen S (DK)

(73) Assignee: Facebook, Inc., Menlo Park, CA (US)

( * ) Notice: Subject to any disclaimer, the term of this patent is extended or adjusted under 35 U.S.C. 154(b) by 26 days.

(21) Appl. No.: 15/051,188

(22) Filed: Feb. 23, 2016

(65) Prior Publication Data
US 2016/0248971 A1    Aug. 25, 2016

Related U.S. Application Data

(60) Provisional application No. 62/119,551, filed on Feb. 23, 2015.

(51) Int. Cl.
*H04N 5/232* (2006.01)
*G06K 9/00* (2006.01)
(Continued)

(52) U.S. Cl.
CPC ......... *H04N 5/23219* (2013.01); *G06F 3/013* (2013.01); *G06K 9/00604* (2013.01);
(Continued)

(58) Field of Classification Search
CPC ............. H04N 5/23219; H04N 5/2329; H04N 5/2354; H04N 5/3532; H04N 5/2256;
(Continued)

(56) References Cited

U.S. PATENT DOCUMENTS

| 7,578,593 B2 | 8/2009 | Hammoud et al. |
| 7,986,816 B1 | 7/2011 | Hoanca et al. |

(Continued)

FOREIGN PATENT DOCUMENTS

| WO | WO-2012052061 A1 | 4/2012 |
| WO | WO-2014125380 A2 | 8/2014 |
| WO | WO-2014125380 A3 | 8/2014 |

OTHER PUBLICATIONS

"DynaVox Announces the EyeMax: New Eye Gaze System Provides Greater Independence", [Online], Retrieved from the Internet: <URL: http://www.dynavoxtech.com/company/press/release/detail.aspx?id=11>, (Aug. 6, 2008), 2 pgs.

(Continued)

*Primary Examiner* — Albert Cutler
(74) *Attorney, Agent, or Firm* — Fenwick & West LLP

(57) ABSTRACT

Eye tracking technology may be used in a wide range of lighting conditions and with many different and varying light levels. In some embodiments, an eye tracking device may employ active illumination (e.g., in the form of infrared light-emitting diodes (LEDs)). However, employing active illumination may reduce the battery life of the device. Under some circumstances (e.g., in a dark environment), the light intensity may be excessive and could be reduced, thereby reducing energy consumption and extending the battery life of the device. An algorithm may be used to adjust the duration of light in eye tracking systems that employ active illumination.

16 Claims, 10 Drawing Sheets

(51) Int. Cl.
*G06K 9/32* (2006.01)
*G06K 9/20* (2006.01)
*H04N 5/235* (2006.01)
*G06F 3/01* (2006.01)

(52) U.S. Cl.
CPC ......... *G06K 9/2027* (2013.01); *G06K 9/3233* (2013.01); *H04N 5/2329* (2013.01); *H04N 5/2354* (2013.01)

(58) Field of Classification Search
CPC ............. G06K 9/00604; G06K 9/2027; G06K 9/3233; G06F 3/013
USPC .................................................. 348/370, 371
See application file for complete search history.

(56) References Cited

U.S. PATENT DOCUMENTS

| | | | |
|---|---|---|---|
| 2004/0005083 A1 | 1/2004 | Fujimura et al. | |
| 2006/0189886 A1 | 8/2006 | Jones et al. | |
| 2006/0227116 A1 | 10/2006 | Zotov et al. | |
| 2007/0146637 A1 | 6/2007 | Johnson et al. | |
| 2010/0238342 A1* | 9/2010 | Ollila | H04N 5/23212 348/345 |
| 2010/0329657 A1* | 12/2010 | Hosoi | G03B 15/16 396/169 |
| 2011/0254865 A1 | 10/2011 | Yee et al. | |
| 2011/0310006 A1 | 12/2011 | Edwards et al. | |
| 2012/0081560 A1* | 4/2012 | Park | H04N 5/23219 348/208.12 |
| 2013/0054576 A1 | 2/2013 | Karmarkar et al. | |
| 2015/0186722 A1* | 7/2015 | Cho | G06K 9/00604 348/78 |
| 2016/0092720 A1* | 3/2016 | Lee | G06K 9/00604 348/78 |
| 2016/0125221 A1* | 5/2016 | Kim | G06K 9/00912 382/117 |
| 2016/0198091 A1* | 7/2016 | Edwards | G06F 3/013 348/78 |
| 2016/0335495 A1* | 11/2016 | Kim | G06K 9/00248 |
| 2017/0193295 A1* | 7/2017 | Kim | G06K 9/00604 |
| 2017/0277950 A1* | 9/2017 | Sung | G06K 9/00617 |

OTHER PUBLICATIONS

Oyekoya, O K, et al., "Eye tracking—a new interface or visual exploration", BT Technology Journal, Springer vol. 24, No. 3, (Jul. 2006), 57-66.

* cited by examiner

ILLUMINATION SYSTEM SYNCHRONIZED WITH IMAGE SENSOR

PRIORITY CLAIM

The application claims priority to U.S. Provisional Patent Application No. 62/119,551, filed Feb. 23, 2015, entitled "Illumination System Synchronized with Image Sensor," which is incorporated herein by reference in its entirety.

TECHNICAL FIELD

The present disclosure generally relates to image capture and, more specifically, to systems and methods of synchronizing illumination with an image sensor.

BACKGROUND

An image capture system may include a light source to illuminate the user's face. Power is consumed by the light source while it is active. A gaze of a user may be determined using eye tracking technology that determines the location of the user's gaze based on eye information present in images of the user's eyes or face captured by the image capture system.

BRIEF DESCRIPTION OF THE DRAWINGS

Some embodiments are illustrated by way of example and not of limitation in the figures of the accompanying drawings.

DETAILED DESCRIPTION

Figure 1:
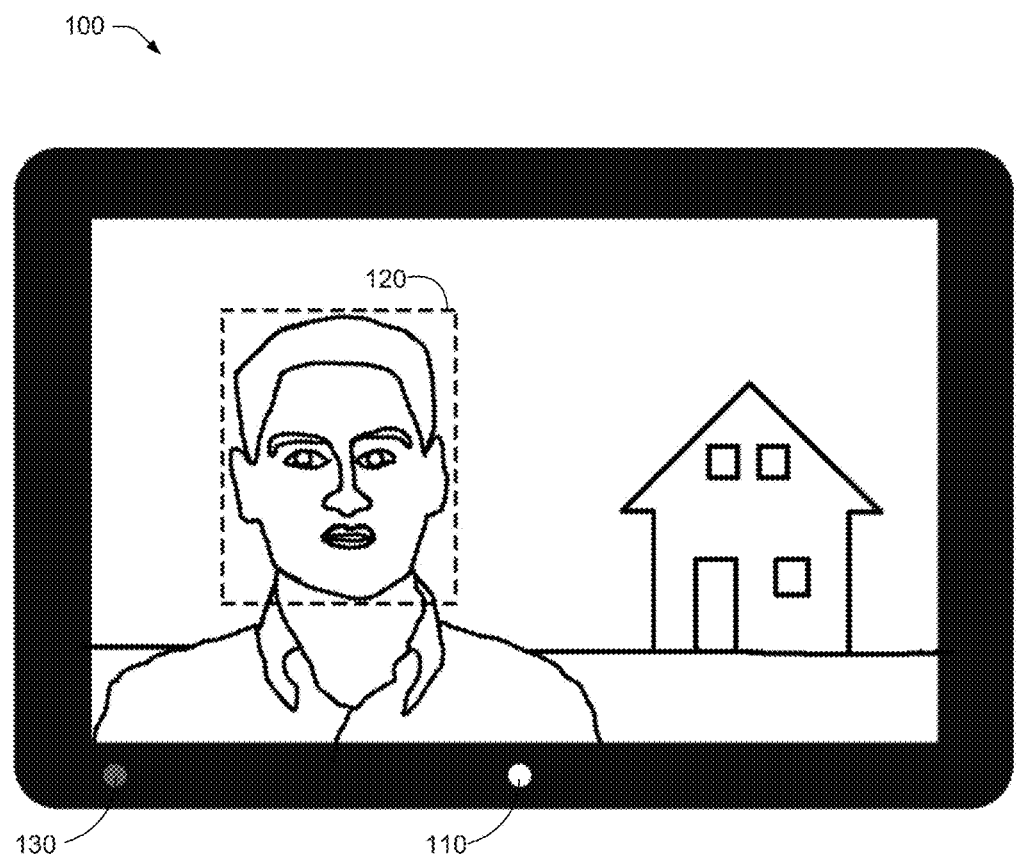
FIG. 1 is a device diagram of an example computing device capable of facilitating eye tracking control, according to some embodiments.

Example systems and methods to facilitate synchronization of an illumination system with an image sensor are described. In the following description, for purposes of explanation, numerous specific details are set forth in order to provide a thorough understanding of example embodiments. It will be evident, however, to one skilled in the art, that the present technology may be practiced without these specific details.

In an example embodiment, a user of a computing device may interact with and control objects and applications displayed on the computing device through the user's eye movement. An image of the user's eyes or face, captured by one or more front-facing cameras on or coupled to the computing device, may be analyzed using computer-vision algorithms, such as, for example, eye tracking algorithms and gaze detection algorithms. For example, the captured images may be processed to extract information relating to features of the user's eyes or face. The computing device may then use the extracted information to determine the location of the user's eyes and estimate the direction in which the user is looking (e.g., gaze direction), the location on the display at which the user is looking, or both. The user's point of regard is the point at which the user's eyes are focused, as interpreted by the computing device. For example, a line beginning at the user's eye and heading in the direction of the user's gaze may be intersected with a plane of a display to determine a point of regard on the display. As another example, lines beginning at each of a user's eyes may be traced until they intersect to determine a point of regard in space.

Using the gaze direction or point of regard, the computing device may be able to estimate which point on the display the user is looking at. The estimation of where the user is looking may be used to direct one or more objects, applications, and the like to perform a particular operation. For example, the user may direct and control the movement of an object on the screen depending on where the user is looking on the display of the computing device, including the movement of objects in a virtual game. As another example, displayed information may be scrolled based on the location the user is viewing.

The eye tracking technology may be used in a wide range of lighting conditions and with many different and varying light levels. For example, the eye tracking technology may be used to detect a user's gaze even if there are one or more light sources near or around the user (e.g., a window behind the user, spotlights in the ceiling, when the user is in a dark room, etc.). In some embodiments, the eye tracking technology is used through a mobile device.

In some embodiments, an eye tracking device employs active illumination (e.g., in the form of infrared light-emitting diodes (LEDs), white LEDs, or lasers). However, employing active illumination may reduce the battery life of the device. Under some circumstances (e.g., in a dark environment), the light intensity may be excessive. Reducing light intensity reduces energy consumption and extends the battery life of the device. Passive illumination (e.g., relying on ambient light) consumes less power, but reduces control over the amount of incident light, potentially rendering the resulting image unusable (e.g., when the ambient light is insufficient to expose the image).

To resolve the lighting issues associated with the one or more cameras used in eye tracking technology, an algorithm may be used to adjust the duration of light emission. In eye tracking systems that employ active illumination (e.g., active infrared illumination), these techniques may also conserve battery life by reducing the intensity of the light when the algorithm determines that tracking is improved with less light emitted by the light sources. Further, image quality may be improved by increasing the intensity of the infrared light when the sensor is capturing a frame or a specific area of the frame, and reducing it otherwise. One of ordinary skill in the art will appreciate that any suitable illumination may be used (e.g., infrared LEDs, lasers, etc.).

FIG. 1 is a device diagram of an example computing device 100 capable of facilitating eye tracking control. The computing device 100 may be any type of computing device, including, but not limited to, a smart phone, a personal digital assistant (PDA), a mobile phone, a computing tablet, an electronic reader, a head-mounted device, a television, a laptop, a desktop computer, a display, an in-vehicle dashboard or heads-up display, a virtual reality headset, an augmented reality headset, and the like. While eye tracking control is described throughout the description, one of ordinary skill in the art will appreciate that the example computing device 100 may be used passively to record the eye movement of a user without the user actively interacting with the computing device 100 (e.g., to facilitate a usability study or to determine the drowsiness level of a driver in a vehicle).

The computing device 100 may include a camera module 110. The camera module 110 may include one or more front-facing cameras placed in any suitable location in any manner within the computing device 100 (e.g., tilted at an angle such that it points toward the user's face) and may be used to capture images of the user's eyes or face. In some embodiments, the camera module 110 on the computing device 100 is used in combination with one or more external camera modules that are external to the computing device 100. The camera module 110 may include a black and white (e.g., monochrome) or color (e.g., red-green-blue (RGB)) complementary metal-oxide-semiconductor (CMOS) sensor, running at an appropriate frame per second rate, a lens with an appropriate field of view and depth of field (e.g., approximately 30-80 cm for a mobile device, approximately 2-5 meters for a television, approximately 1-5 cm for a head-mounted device, etc.), or any suitable combination thereof.

The field of view and depth of field of the lenses of the one or more cameras in the camera module 110 may allow the user to move around, thereby accommodating for head pose variance of the user. The computing device 100 may use eye tracking control software to analyze the images taken by the camera module 110 and provide coordinates (e.g., two-dimensional/x, y coordinates or three-dimensional/x, y, z coordinates) of where the user is looking on the display of the computing device 100. The coordinates may be used for any number of applications (e.g., scrolling, moving objects, selecting icons, playing games, or any suitable combination thereof).

The camera module 110 may be turned on and/or off in any manner, such as programmatically by an application, by utilizing an external slider, an on-off dedicated button on the computing device 100, an application or a digital button on the screen, or the camera module 110 may be controlled by movement or shaking of the computing device 100, controlled by voice commands, on-screen capacitive buttons, touch pads, bio-signals (e.g., electromyography (EMG), electroencephalogram (EEG), etc.), remote wireless control, or any suitable combination thereof. As such, in some embodiments, the eye tracking components consume power only while the camera is turned on (e.g., when the user is using the eye tracking features).

The images captured by the camera module 110 may be rotated. The eye tracking software may use sensors on the computing device 100 (e.g., accelerometer, magnetometer, etc.) to detect the orientation of the computing device 100 and rotate the images taken by the one or more cameras in camera module 110 accordingly so that they can be properly processed.

The images captured by the camera module 110 may include the user's face region 120, as well as other elements present in the background, as shown in FIG. 1. In order to improve the detection of eye features by the eye tracking technology of the computing device 100, the eye tracking device may adjust different lighting attributes (e.g., timing, duration, intensity, or any suitable combination thereof) with the objective of optimizing image quality around the face region 120 or the eye region(s). This may include optimizing image quality around the face region 120 or around the eye region(s) while disregarding other portions of the image. The user's face region 120 may be detected in the image using any suitable algorithm (e.g. the Viola-Jones object detection framework, which robustly detects when a face is in an image) and may be tracked over time using any suitable algorithm, such as mean-shift or the Lucas-Kanade method.

The computing device 100 may include one or more light sources 130. In some embodiments, the one or more light sources 130 are infrared LEDs. For explanatory purposes, infrared LEDs may be used to describe the one or more light sources 130 throughout the disclosure. However, one of ordinary skill in the art will appreciate that any appropriate light-emitting source may be used.

The one or more cameras in camera module 110 may be placed at an appropriate distance from the light source 130 to optimize the proper capture of the infrared light.

In some example embodiments, the camera module 110 also includes a suitable type of infrared pass filter (e.g., active, mechanical, high-pass, band-pass, or any suitable combination thereof). In some example embodiments, a high-pass filter that blocks light with a wavelength below 800 nm and allows light with a wavelength above 800 nm is used. In some example embodiments, the infrared band pass filter only allows light having a wavelength between 800 and 900 nm to enter the one or more cameras of the camera module 110. In some example embodiments, the cameras in the camera module 110 include an infrared-pass filter for one set of cameras and an infrared-blocking filter for another set of cameras.

An image of the user, including the user's face region 120, may be captured by the one or more cameras of the camera module 110. The LEDs 130 may emit light that is directed toward the eyes of the user. The infrared light from the LEDs 130 may be reflected in the pupil and on the cornea of the user and recorded by the cameras in the camera module 110. In some embodiments, the LEDs 130 are synchronized with the one or more cameras so that the LEDs 130 emit light only when the one or more cameras are taking an image and remain off otherwise.

In some embodiments, the eye tracking features are optimized when the camera module 110 is located at the bottom of the computing device 100 (e.g., with respect to the perspective of the user). The user may rotate the computing device 100. In some embodiments, using a motion sensor (e.g., accelerometer or gyroscope) of the computing device 100, the LEDs 130, the pass filter, and the camera module 110 are turned on or off depending on the orientation of the computing device 100. For example, the LEDs 130 and the camera module 110 may be turned off when the computing device 100 is rotated such that the camera module 110 is located at the top of the computing device 100 with respect to the perspective of the user. In some embodiments, a specific set of LEDs 130 and/or camera modules 110 are turned on or off depending on the orientation of the device 100, such that the optimal combination of LEDs and camera are used for the given orientation of the device 100.

In some example embodiments, the LEDs 130 and the camera module 110 are turned off or set in low-power mode when the user's face is not detected or recognized for a predetermined amount of time (e.g., 5-10 seconds) and turned on again when the user's face is detected or recognized. For example, in a low-power mode, images may be captured at a lower frame rate, allowing the user's face to be detected if it appears, but not attempting to track the user's gaze in real-time. In this example, when the user's face is detected again, the camera(s) may be returned to a high-performance mode, in which images are captured at a faster frame rate.

In some example embodiments, the camera module 110 or the light sources 130 are included in an external device that is connected to the computing device 100 (e.g., an external docking device) instead of being located within the computing device 100. The external device may include any suitable hardware-implemented modules to perform eye tracking functions, such as hardware-implemented modules to process the images taken by the camera module 110 (e.g. a dedicated image signal processor (ISP)), control the light sources 130, or any suitable combination thereof.

Figure 2:
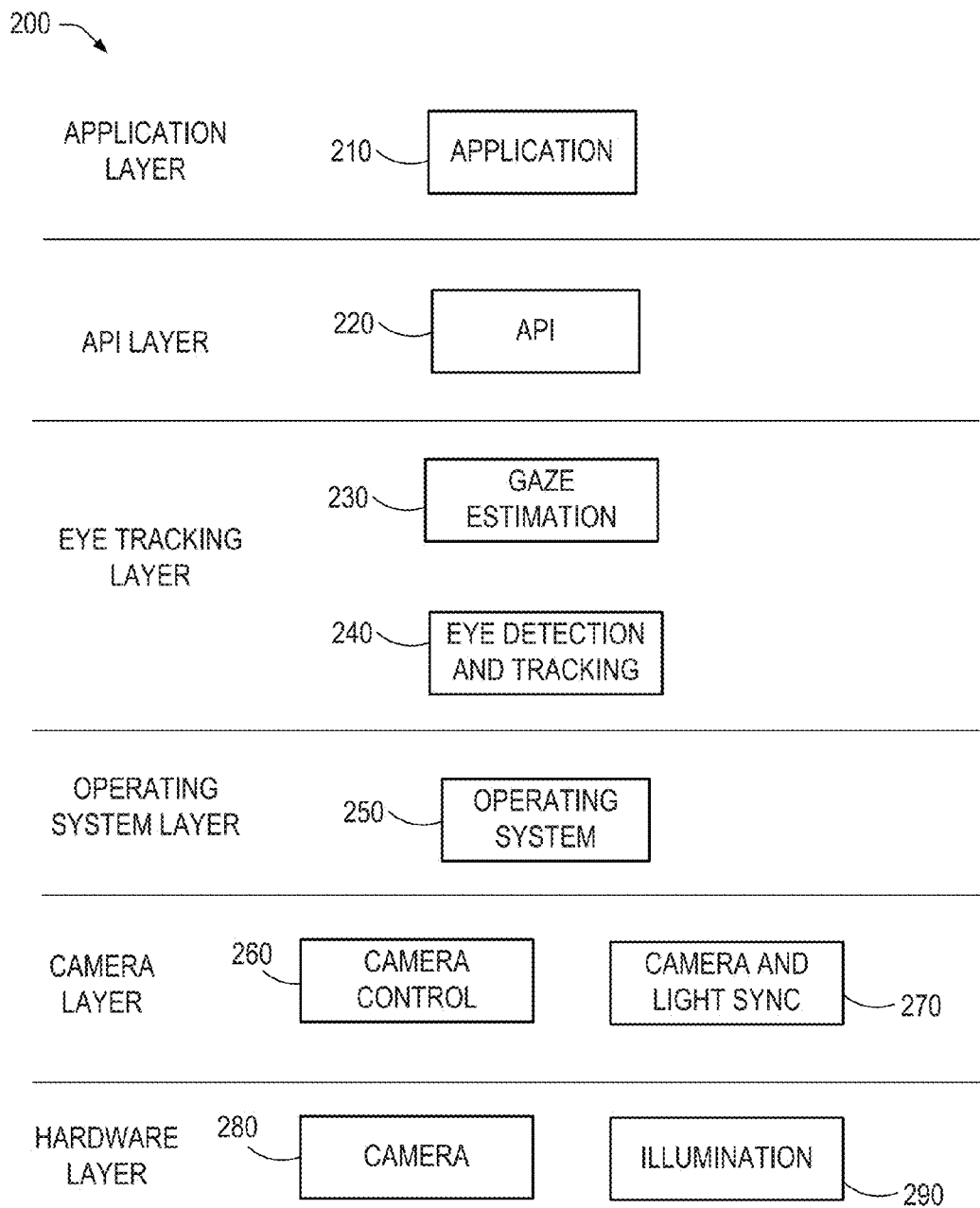
FIG. 2 is a block diagram of an example software architecture for facilitating eye tracking control, according to some embodiments.

FIG. 2 is a block diagram of an example software architecture 200 for facilitating eye tracking control. Any one or more of the components of the software architecture 200 may run on either a control processing unit (CPU) of the computing device 100 or on a combination of a CPU and a graphics processing unit (GPU) of the computing device 100. In some example embodiments, one or more of the components of the software architecture 200 run on a dedicated chip. The software may run as a background process (e.g. as part of the operating system (OS) or in a web browser) and may provide an application programming interface (API) that other applications can access. The API may fire an event or use some other similar mechanism to send the information of where the user is looking on the screen to other applications. One of ordinary skill in the art will appreciate that additional or fewer elements may be included in the example software architecture 200 shown in FIG. 2.

The software architecture 200 may be divided into different layers. The hardware layer may include a camera module 280 and an illumination module 290 that correspond to the respective hardware. A camera layer may include a camera control module 260 that is in charge of communicating with each camera in order to perform camera operations such as starting the camera, grabbing images, controlling the camera properties, triggering the sensor to grab an image, or any suitable combination thereof. The camera control module 260 may also include the circuitry necessary to process the images delivered by the camera module 280. For instance, the camera control module 260 may include a processor (e.g., an ISP) that may optimize image quality, detect regions of interest on the image, crop the image delivered by camera module 280, and so forth. The camera layer may also include a camera and light synchronization module 270, which synchronizes the cameras and the emitters (e.g., infrared emitters) so that the lights are controlled in such a way that tracking of the user's eyes is improved, gaze accuracy is increased, energy consumption is minimized, or any combination thereof. In some example embodiments, the face detection and/or eye tracking algorithms are used to optimize the illumination by decreasing or increasing the amount of light depending on parameters issued by the eye tracking engine or the camera control module 260. In some example embodiments, the camera layer is configured to strobe the infrared LEDs 130 at the frequency of the camera trigger output. In some example embodiments, the eye tracking software is configured to adjust the intensity of the infrared LEDs 130 based on an area of the frame being captured by the camera (e.g., the area where the face is located). In some example embodiments, this synchronization is achieved by using one or more trigger signals provided by the camera layer to the camera module 280 and the illumination module 290.

Once an image is captured by the sensor of the camera module 280, the image is sent to the eye tracking circuitry for further processing (e.g. detection of eye features and calculation of gaze direction or point of regard). In some embodiments, the camera layer delivers images to the camera control module 260, which processes the images before delivering them to the eye tracking layer. In some embodiments, the camera control module 260 detects regions of interest in the image, such as faces, and provides a cropped image of such region to the eye tracking layer. In the eye tracking layer, an eye detection and tracking module 240 may process images to find features like face location, eye region location, pupil center, pupil size, location of the corneal reflections, eye corners, iris center, iris size, or any suitable combination thereof. These features may be used by the gaze estimation module 230 in the gaze estimation stage, which may be in charge of calculating the point of regard of the user. The gaze estimation module 230 may also calculate the optical and visual axes of the user's eyes and calibrate the calculation based on specific features of the user.

In some example embodiments, the operating system layer (including the operating system 250) provides a bridge between the camera layer and the eye tracking layer. The operating system 250 may provide standardized interfaces for applications to interact with hardware via device drivers.

The API layer may be used for communication between the eye tracking layer and applications that use eye gaze information. An API module 220 may send data calculated by the eye tracking layer, such as coordinates of the point of regard, three-dimensional (3D) location of the user's eyes, pupil size, distance between the eyes, head orientation, head movement, or any suitable combination thereof. The API module 220 may also accept commands from an application to the eye tracking layer (e.g., to start and/or stop the eye tracking engine, query for specific information, change the mode in which the eye tracking engine works, etc.). An application module 210 may connect to the eye tracker's API module 220 and use eye gaze information for any suitable purpose (e.g., control an app or a game, record eye data for future use, determine the drowsiness level of a driver, measure a person's interest in a particular object, or any suitable combination thereof).

Figure 3:
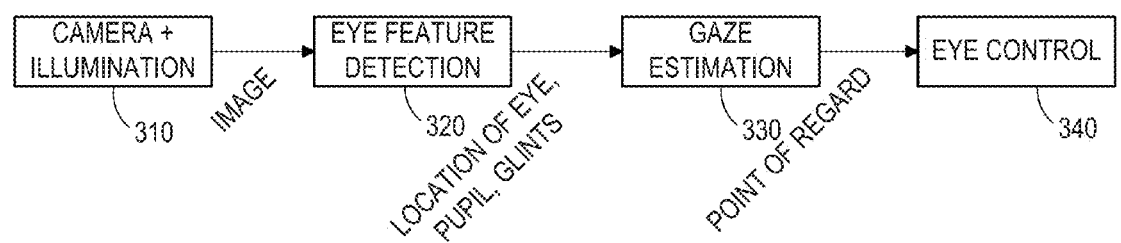
FIG. 3 is a block diagram of an example flow of data used to facilitate eye tracking control, according to some embodiments.

FIG. 3 is a block diagram of an example flow of data used to facilitate eye tracking control. The one or more cameras and the illumination modules 310 (e.g., providing illumination via infrared LEDs) may capture an image of the user. The eye feature detection module 320 may use the captured data to detect eye features (e.g., location of eye(s), pupils, corneal reflections, etc.). Using the detected eye features, the gaze estimation module 330 may estimate the user's point of regard, which may then be used to control aspects of an application through the eye control module 340.

A calibration process may be conducted when the user initially uses the eye tracking functionality in order to calculate personal parameters (e.g., vertical and horizontal offset between optical and visual axes). These personal parameters and the information of the face and eyes are then employed to estimate where the user is looking on the screen through a gaze estimation algorithm.

Figure 4:
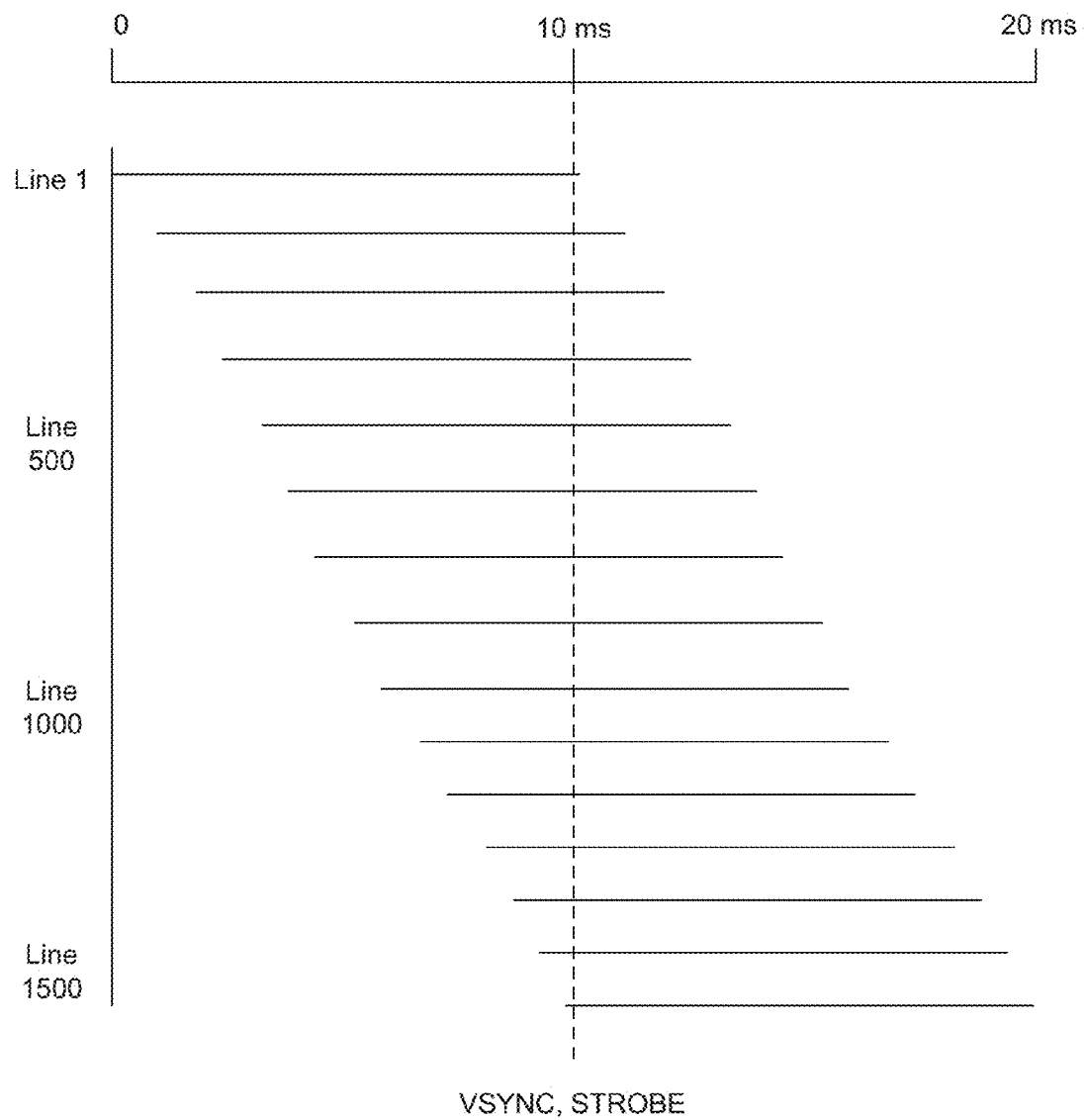
FIG. 4 is a timing diagram of an example embodiment of a rolling shutter image sensor.

FIG. 4 is a timing diagram of an example embodiment of a rolling shutter sensor. Sensors can be roughly divided into two categories: global shutter and rolling shutter. Global shutter sensors capture an entire image at the same time (e.g. all the pixels expose the image simultaneously). In contrast, rolling shutter sensors read out the lines continuously, one after the other, so that the rows are not simultaneously but sequentially exposed and read out from top to bottom.

The sensor may output one or more different timing signals to indicate when the full frame has been readout, when each line is going to be exposed, when each line is ready to be read out, or any suitable combination thereof. These signals can be used to synchronize the illumination system with the image capture, as will be described below. FIG. 4 shows an example full frame readout that results in an 11 ms readout time for each frame. As shown in FIG. 4, a vertical synchronization (VSYNC) signal and a STROBE signal are generated once the first line is fully exposed. Other signals not depicted in FIG. 4 that can be used for synchronization with the illumination system may include a horizontal synchronization (HREF) signal that is activated when each line starts being exposed or is read out, a vertical synchronization signal that is activated when each frame starts being exposed or is read out, and so forth.

In some example embodiments, the synchronization between the sensor and the illumination system is achieved by using a trigger signal instead of, or in combination with, one or more timing signals provided by the sensor. This trigger signal may be provided by an external module to the sensor to indicate when it should perform an action (e.g., start exposing a frame, activate a light source, deactivate a light source, or any suitable combination thereof). The different hardware or software modules that may provide the trigger signal include the camera control module 260 (e.g. the ISP or the camera driver), the camera and light synchronization module 270, the eye tracking layer, and so forth. The trigger signal may also be used by the camera and light synchronization module 270 to determine when to turn the LEDs on and off in synchronization with the image or part of the image being captured by the sensor, as will be described below. For the sake of simplicity, the descriptions below refer to embodiments using a timing signal provided by the sensor (e.g. VSYNC or HREF). However, it will be clear to those of ordinary skill in the art that external signals may be used as well.

As can be seen in the example of FIG. 4, each line of the image has a 10 ms exposure time, but the lines do not all begin their exposure period simultaneously. In this example, the readout of data for a line takes 0.007 ms. As a result, the data for the first line is read out 10.007 ms after the exposure begins (10 ms for exposure+0.007 ms for readout). The data for the last line is read out 20.5 ms after exposure of the frame begins (10 ms for exposure+10.5 ms delay before the last line begins exposure due to the total readout time, 1500 lines*0.007 ms=10.5 ms). In various devices, the delay between beginning exposure of the first and last lines, the duration of the exposure, and the amount of time required to readout a line may vary.

Figure 5:
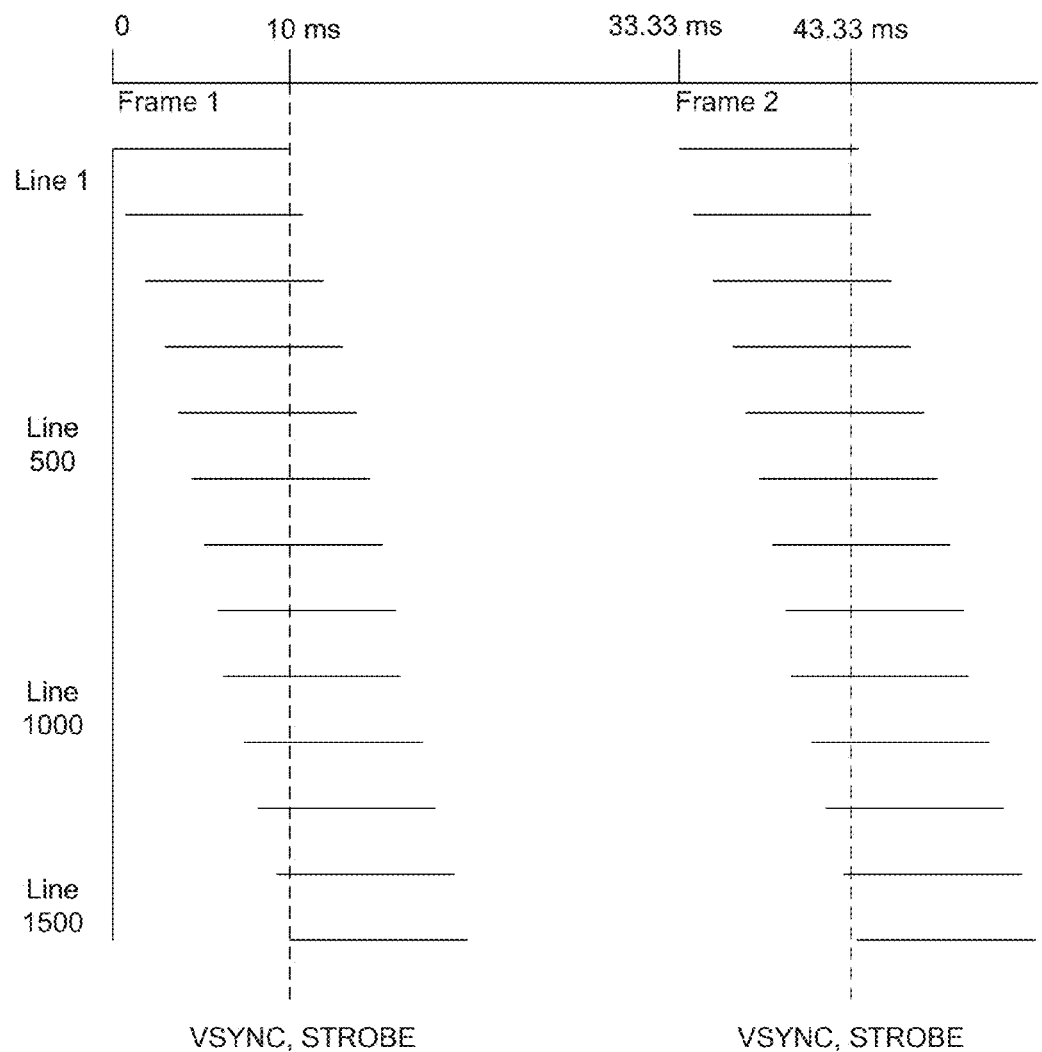
FIG. 5 is a timing diagram of an example embodiment of an illumination system synchronized with an image sensor.

FIG. 5 is a timing diagram of an example embodiment of a rolling shutter image sensor. FIG. 5 shows an example rolling shutter sensor working at 30 Hz, which results in 33.33 ms between frames. Thus, in this example, 12.83 ms elapse between the completion of the readout of Frame 1 and the beginning of the exposure of Frame 2. Accordingly, about 37% of the power (12.83 ms saved of 33.33 ms) expended on illumination may be saved by turning off the illumination during the gaps between frames. Since the same illumination is used while the frame is exposed, energy is saved without compromising image quality. Furthermore, by reducing the amount of time the illumination system emits light, heat generated by the LEDs may be reduced. This technique is referred to as a full frame strobe. Additional hardware and software is required to provide the illumination control, compared to a system which simply turns on a lighting device and leaves it on. Therefore, the actual power savings may be less than the calculated 37% because of power consumption of the additional control functionality, power consumption of the light in switching on and off, or both.

Figure 6:
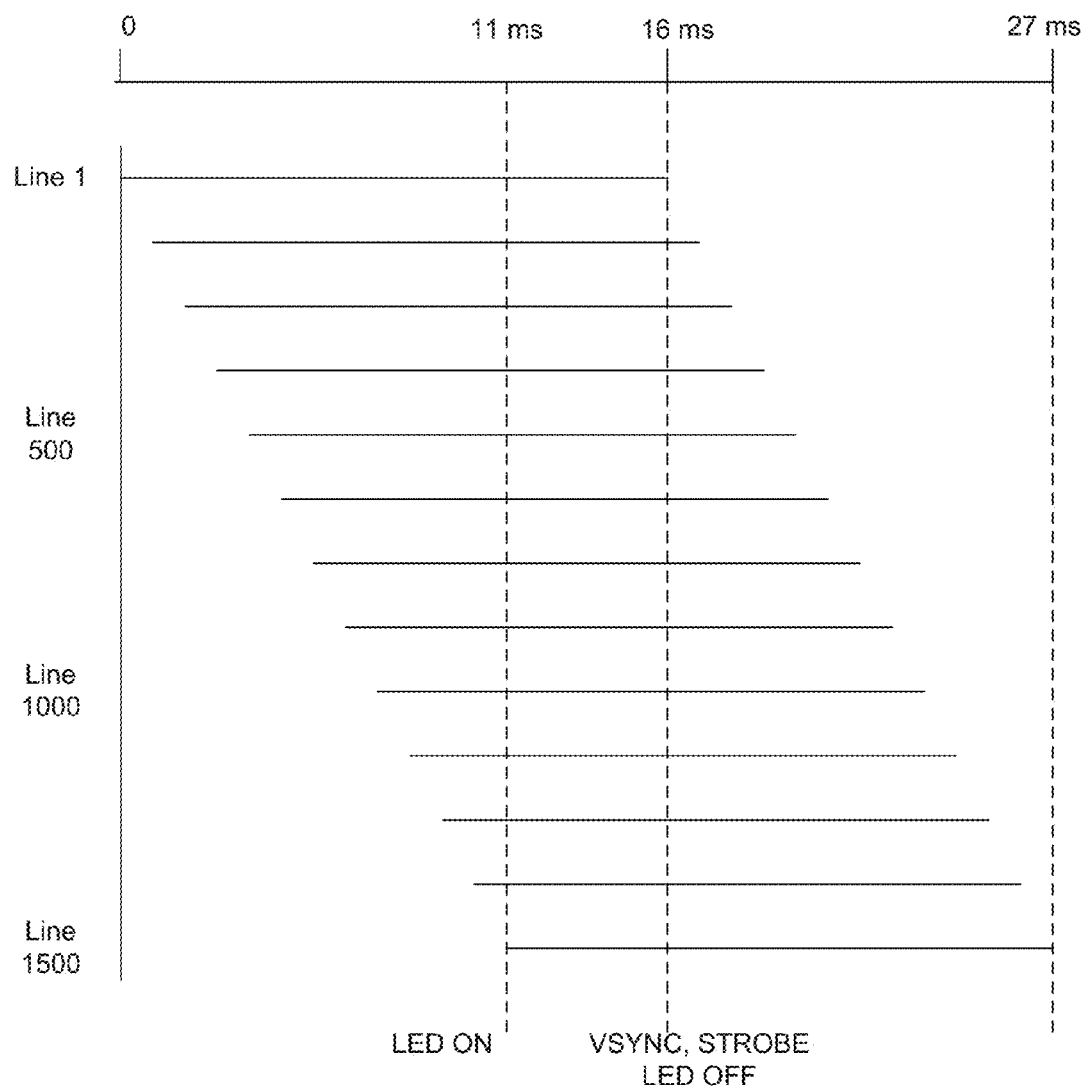
FIG. 6 is a timing diagram of an example embodiment of an illumination system synchronized with an image sensor.

FIG. 6 is a timing diagram of an example embodiment of an illumination system synchronized with an image sensor. Due to the image being captured in rows in a rolling shutter sensor, a long exposure time may lead to artifacts (e.g., a wobbly effect) when the camera or the subject moves. It is therefore of high interest to keep a low exposure time to avoid blurry images. To avoid the artifacts created by the rolling shutter, it is possible to pulse the illumination from the lights between two frames and before the readout of the first row, so that each row is equally exposed. This method will be referred to herein as a global strobe. The global strobe can be used to strobe with a high light intensity for a very short duration (e.g., less than 10 ms). This resembles a very short exposure, since the lights are only turned on for a very short period, even if the sensor has a long exposure time. Since the duration of the strobe may be very short, it is possible to increase the overall light intensity in the image, or reduce the power usage of the system, when compared to constant illumination or to the full frame strobe.

FIG. 6 shows an example of applying LED global strobe with a 5 ms strobe duration. When using the LED global strobe mode with a rolling shutter sensor, the exposure needs to be the longer than the readout time. Thus, in the example of FIG. 6, the readout time of the camera is taken to be a fixed 11 ms. Accordingly, the exposure time of the camera is set to 16 ms (5 ms+11 ms). This enables the 5 ms duration of the strobe to cover the last 5 ms of exposure of the first line, the first 5 ms of exposure of the last line, and intermediate portions of the exposures of intermediate lines. In some example embodiments, longer exposure times are used. However, increasing the exposure time increases the risk that other light sources will affect the resulting image.

As can be seen by comparison of FIGS. 5 and 6, the strobe duration of the LEDs in a global strobe mode is shorter than in the full frame strobe. The light intensity may be increased in order to compensate for the shorter duration. For instance, in this example, the intensity of the LED may be doubled to compensate for the halving of the duration of the illumination. That is, in the full frame example, the light was on for 20.5 ms each frame, and each line was exposed 10 ms of the 20.5 ms. Accordingly, even though the light is on for only 5 ms in this global strobe example—less than a quarter of the duration of the full frame example—the amount of light actually used for exposure of each line is only reduced by half, when the intensity is kept constant.

In 30 Hz mode with double LED intensity and a 5 ms strobe duration, compared to constant illumination, 70% energy may be saved. Compared to LED full frame strobe, there may be a 47% energy savings. Further, this method may eliminate, partially or totally, the artifacts produced by the rolling shutter sensor when the object is moving.

When running the camera with a rolling shutter, it is possible to adjust the exposure and the strobe duration of the LED so that only a defined number of lines are illuminated, namely the region of the sensor where an object of interest is located. The region where such object is located, or region of interest (ROI), may be provided by an algorithm running on a different module. For instance, the ROI may be the region where the eyes are located, and may be provided by the camera control module, such as a face detector on ISP or an eye tracking algorithm running on a processor of the camera. By illuminating only the lines of the sensor containing the ROI, image quality on the region that contains the object to be detected is improved, while the rest of the image is dark (with a roll off of partially illuminated lines before and after the LED ROI).

Figure 7:
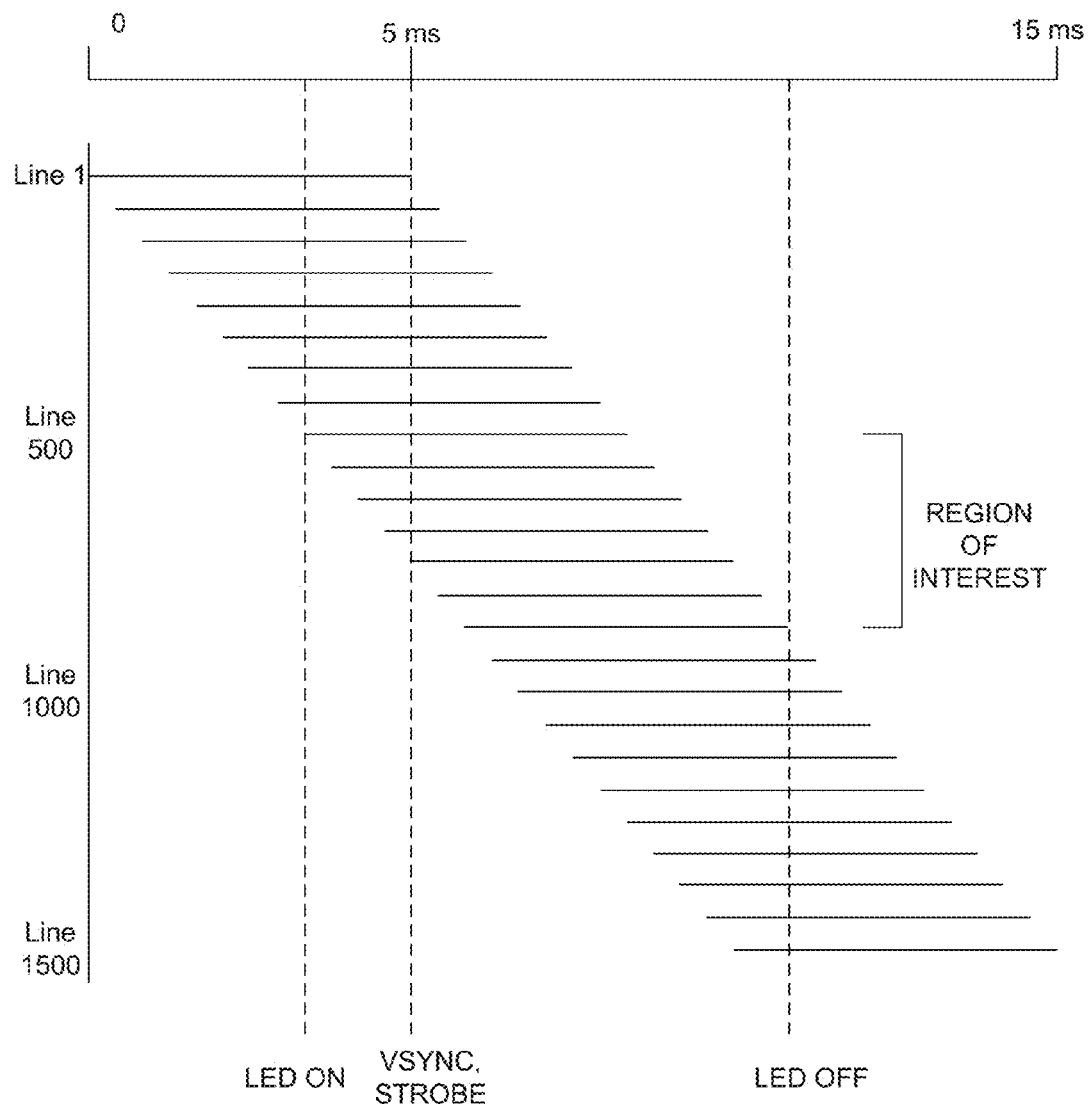
FIG. 7 is a timing diagram of an example embodiment of an illumination system synchronized with an image sensor.

FIG. 7 is a timing diagram of an example embodiment of an illumination system synchronized with an image sensor. FIG. 7 shows an example where the region of interest, or ROI, is within lines 500 to 900 of the sensor. In this case, the sensor has a 5 ms exposure time, and the LED illuminates lines 500 to 900. The strobe starts at the exposure start of line 500 and terminates when line 899 has been read out. The strobe duration is in this case 7.8 ms (5 ms exposure+400 lines*0.007 ms=7.8 ms). In 30 Hz mode with double LED intensity and a 7.8 ms strobe duration, compared to continuous illumination, 53% energy may be saved.

As described above, a sensor may output timing signals that indicate when a line is about to be exposed or has been read out, or when a full frame has been captured. The LED ROI is achieved by synchronizing the strobe of the LEDs with one or more of these timing signals provided by the sensor. The LED strobe is synchronized so that the strobe starts when exposure of the first line of the ROI (e.g., face or eyes region) begins. In some embodiments, the LED strobe is synchronized with a trigger signal provided by an external module.

In some example embodiments, synchronization is performed by detecting a VSYNC signal generated at the beginning of the frame and calculating a total delay based on the number of lines to the beginning of the region of interest and the time to begin exposure of each sequential line. For example, if the first line begins exposure simultaneously with the generation of the VSYNC signal and each successive line begins 0.007 ms after the previous line, then when the ROI begins at line 500, exposure of the first line of the ROI begins 3.493 ms after the VSYNC signal is generated (499*0.007 ms). The VSYNC signal may be provided by the sensor itself or an external module.

In the example embodiments of FIGS. 5 and 6, the VSYNC signal is generated at the end of the exposure of the first line of each frame. In example embodiments using this timing of the VSYNC signal, the beginning of the ROI of the next frame is determined in response to receiving the VSYNC signal for the current frame. For example, in FIG. 5, the VSYNC signal for frame 1 is received at 10 ms and the beginning of the exposure frame 2 is at 33.33 ms. Accordingly, the beginning of the exposure of frame 2 occurs 23.33 ms after the receipt of the VSYNC signal for frame 1. Thus, the calculations above for a VSYNC signal received at the beginning of a frame can be used with the addition of an element for the delay between the VSYNC signal of the previous frame and the beginning of exposure of the current frame.

In some example embodiments, synchronization is performed by detecting an HREF signal generated when the sensor begins exposing each line and identifying the beginning of the region of interest based on a count of the HREF signals. For example, when the ROI begins at line 500, exposure of the first line of the ROI begins when the 500th HREF signal is received within the frame. The HREF signal may be provided by the sensor itself or an external module.

The proposed method may adjust the size of the LED ROI (i.e., the number of lines being illuminated) and the light intensity on the LED ROI depending on different factors: the location of the user with respect to the camera and/or LEDs (e.g. distance, position of the eyes on the image, 3D location, etc.), the contrast between pupil and iris, size and contrast of the corneal reflections, the brightness on the face region or a portion of the face region, the histogram of the eye region, or any suitable combination thereof. For instance, when the user is closer to the camera/LEDs, the size of the LED ROI may increase and the light intensity may decrease. When the user is further away, the size of the LED ROI may be smaller, but the light emitted by the LEDs may increase in order to get enough light to the user's eyes. Further, camera parameters such as gain or exposure may be adjusted as well in combination with LED ROI size and LED intensity.

Adjusting the intensity in the image is achieved by setting the strobe duration, which defines the time the LED is on, adjusting the intensity of the LEDs by adjusting the current or voltage, matching the settings of the camera (e.g., exposure), or any suitable combination thereof. In some example embodiments, pulse width modulation (PWM) in the strobe period is used to adjust the intensity in the image, and some LEDs are turned on or off to achieve the desired intensity.

Figure 8B:
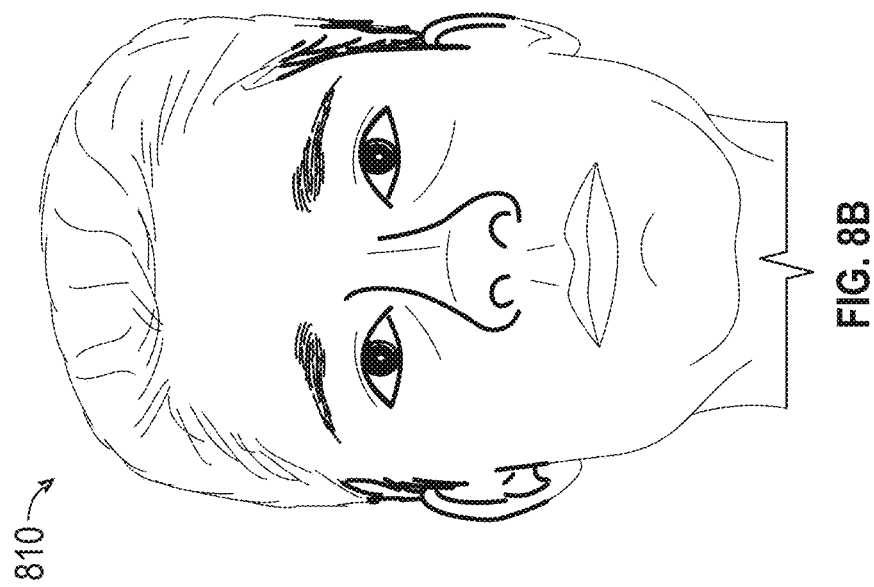
FIGS. 8A-8B are images adjusted using light modulation, according to some example embodiments.
Figure 8A:
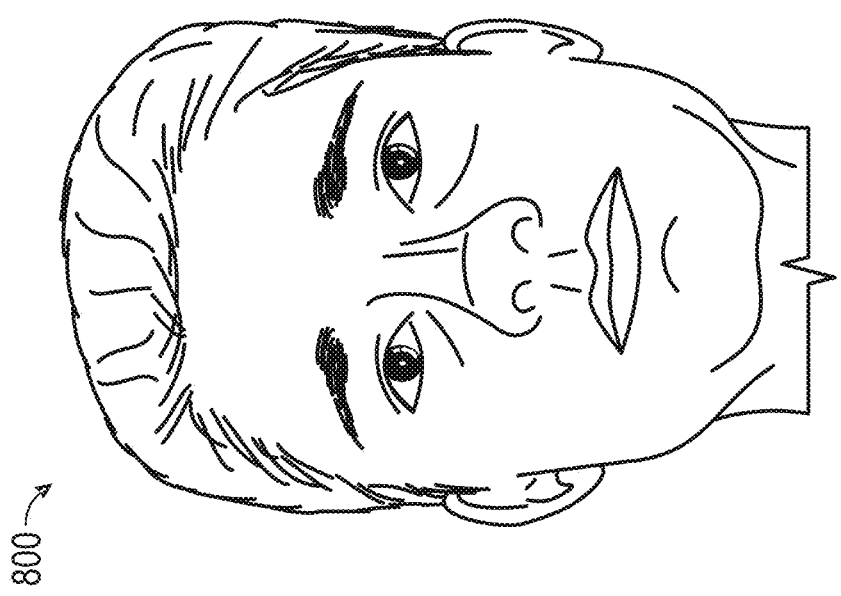

FIGS. 8A-8B are example images adjusted using light modulation. In FIG. 8A, the example image 800 shown is an image in which the illumination was provided for the duration of the image capture, causing the face to be illuminated to an equal degree throughout the image. In FIG. 8B, the example image 810 shown is an image in which the illumination was provided for only a portion of the image capture, namely the eye region, causing the face to appear to be illuminated only in a portion of the image. When an application is only interested in analyzing a portion of the image, the images in FIG. 8A and FIG. 8B may be of equal value. However, by activating the illumination for a shorter period, less power may be consumed by the light source during the creation of FIG. 8B. In some example embodiments, the intensity of the light is increased for the shorter duration that the light is activated during the creation of FIG. 8B. Accordingly, the relevant portion of FIG. 8B may be of higher quality than the corresponding portion of FIG. 8A.

Figure 9:
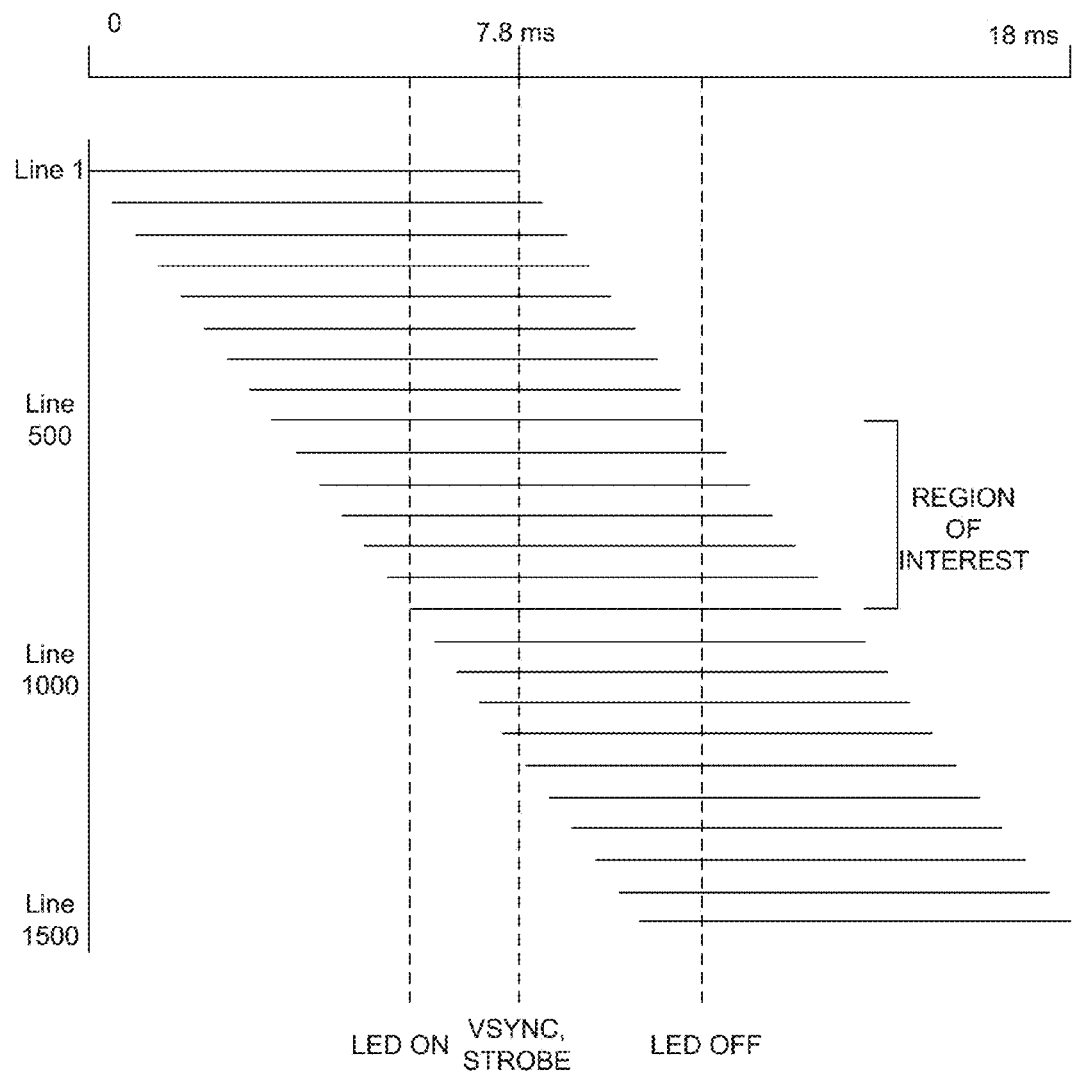
FIG. 9 is a timing diagram of an example embodiment of an illumination system synchronized with an image sensor.

FIG. 9 is a timing diagram of an example embodiment of an illumination system synchronized with an image sensor. LED ROI illumination may be used in combination with the global strobe mode explained above. This may enable further energy savings. FIG. 9 shows an example of an LED ROI combined with LED global strobe where the LED is on for 5 ms instead of 7.8 ms as in FIG. 8. The resulting exposure time of the sensor is 7.8 ms.

Combining LED ROI with LED global strobe allows for a shorter exposure time than LED global strobe alone. The shorter exposure time reduces the amount of ambient light captured and may also reduce energy consumption of the sensor. For example, in LED global strobe, the exposure time may be 15.5 ms, and therefore more ambient light is captured, whereas by combining LED ROI and LED global strobe, a shorter exposure time of 5 ms may be used instead. The combination of LED ROI with LED global strobe is also advantageous over LED ROI because it allows for a shorter strobe time.

In some example embodiments, the LED ROI strobe is combined with the camera ROI, so that the only part of the image that is lit up is the area that is transferred from the sensor.

In some example embodiments, LED ROI strobe is combined with camera exposure ROI. In this case, only the lines containing the ROI have an appropriate exposure time, while the rest of the lines in the image take a low exposure time (as low as possible). This may maximize the amount of light received in the area of the sensor where the eye region is projected and result in an uneven exposure across the image where a very low exposure time is used for non-essential lines and a normal exposure is used for ROI lines.

In some example embodiments, the timing signals provided by the sensor are used to synchronize the sensor readout with the exposure time setting, such that exposure time is higher while the sensor is reading the lines that correspond to the ROI (e.g., the eye region), and lower while the sensor is reading out the rest of the lines. In particular, the exposure time could be as low as possible, hence getting very dark (or even black) pixels.

The combination of LED ROI strobe with camera exposure ROI allows for a constant frame readout speed (e.g., one frame every 16.6 ms for a 60 frames per second framerate), while improving the contrast on the eye region area, thus increasing the picture quality in that region. In some example embodiments, the combination of LED ROI strobe with camera exposure ROI is instead used to increase the frame rate while maintaining picture quality in the ROI. In some example embodiments, camera exposure ROI is enabled by the sensor supporting setting a different exposure time for each line.

Another potential benefit of using LED ROI strobe is that the regions of the image that are not illuminated may be very dark. In situations where the camera compresses the images before sending them through the bus to the upper layers, having dark or even black areas may provide a better compression, and therefore the amount of data sent through a given bus may be decreased significantly. Similarly, processing time to compress large dark areas may be reduced compared to processing time to compress complex image areas.

In some example embodiments, the controller associated with the sensor or the camera control module discards data that is outside the region specified by the face detection or eye tracking modules. As an alternative, the controller may discard data that is not above a given gray threshold. Only ROI or well illuminated regions would therefore be sent to the upper layer, thus again reducing bandwidth requirements. However, so long as the sensor itself captures full frames, the framerate cannot be increased. By contrast, camera ROI allows the framerate to be increased by only capturing a portion of the frame.

Certain embodiments are described herein as including logic or a number of components, modules, or mechanisms. Modules may constitute hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations are performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
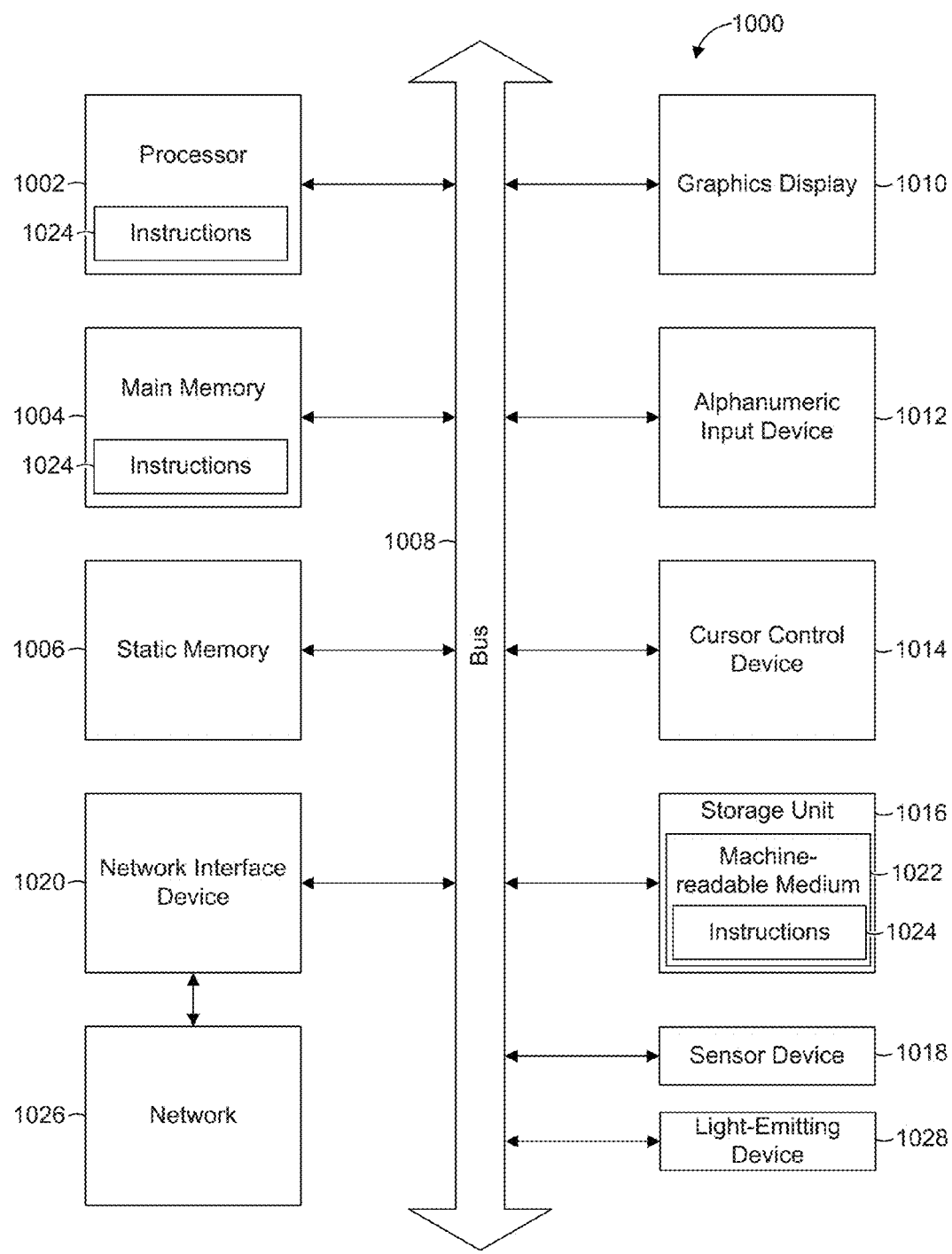
FIG. 10 is a block diagram of a machine in the example form of a computer system within which a set of instructions, for causing the machine to perform any one or more of the methodologies discussed herein, may be executed, according to some example embodiments.

FIG. 10 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes a processor 1002 (e.g., a CPU, a GPU or both), a main memory 1004, and a static memory 1006, which communicate with each other via a bus 1008. Computer system 1000 may further include a graphics display device 1010 (e.g., a liquid crystal display (LCD) or a cathode ray tube (CRT)). Computer system 1000 also includes an alphanumeric input device 1012 (e.g., a keyboard), a cursor control device 1014 (e.g., a mouse or touch sensitive display), a disk drive unit 1016, a sensor device 1018 (e.g., a camera, an accelerometer, a magnetometer, a light meter) a network interface device 1020, and a light emitting device 1028 (e.g., one or more LEDs).

Disk drive unit 1016 includes a machine-readable medium 1022 on which is stored one or more sets of instructions and data structures (e.g., software) 1024 embodying or utilized by any one or more of the methodologies or functions described herein. Instructions 1024 may also reside, completely or at least partially, within main memory 1004, within static memory 1006, and/or within processor 1002 during execution thereof by computer system 1000, with main memory 1004 and processor 1002 also constituting machine-readable media.

While machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Instructions 1024 may further be transmitted or received over a communications network 1026 using a transmission medium. Instructions 1024 may be transmitted using network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone system (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although the technology has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
identifying a region of interest of an image to be captured by a camera comprising a rolling shutter image sensor, the image captured by sequentially exposing lines of the image sensor starting with a first line of the image sensor, the region of interest beginning at a beginning line of the image sensor and ending at an ending line of the image sensor and corresponding to a region of the image depicting an eye;
determining a delay period between a time at which the first line of the image sensor begins exposure and a time at which the ending line begins exposure;
capturing a filtered infrared image by the camera, wherein capturing the filtered infrared image comprises:
detecting a signal by a processor of a machine, the signal indicating a time at which the first line of the image sensor begins exposure, and
responsive to the delay period elapsing from the detection of the signal, activating an infrared light source, and wherein the camera further comprises an infrared pass filter that passes light having wavelengths in a range between 800 nm and 900 nm and attenuates light having wavelengths outside the range;
detecting one or more eye features in the region of interest of the filtered infrared image; and
determining a point of regard based on the one or more eye features, the point of regard identifying a position on a display at which the eye is looking.

2. The method of claim 1, wherein the signal is a trigger signal from a camera control module.

3. The method of claim 1, further comprising:
determining an activation period based on a number of lines between the beginning line and the ending line; and
responsive to the activation period elapsing from the activation of the light source, deactivating the light source.

4. The method of claim 3, wherein determining the activation period comprises determining a period between a time at which the ending line begins exposure and a time at which the beginning line ends exposure.

5. The method of claim 1, wherein the region of interest of the image includes a region of the image depicting an eye and excludes a region of the image depicting at least a portion of a face.

6. The method of claim 1, wherein the region of interest of the image is a region of the image depicting a face.

7. The method of claim 1, further comprising:
detecting the region of interest in the filtered infrared image; and
prior to detecting one or more eye features in the region of interest, cropping the filtered infrared image to generate a cropped image, the cropped image including the region of interest and excluding portions of the image outside the region of interest.

8. A system comprising:
a memory that stores instructions;
an infrared light source; and
one or more processors, configured by the instructions to perform operations comprising:
identifying a region of interest of an image to be captured by a camera comprising a rolling shutter image sensor, the image captured by sequentially exposing lines of the image sensor starting with a first line of the image sensor, the region of interest beginning at a beginning line of the image sensor and ending at an ending line of the image sensor and corresponding to a region of the image depicting an eye,
determining a delay period between a time at which the first line begins exposure and a time at which the ending line of the image sensor begins exposure,
capturing a filtered infrared image by the camera, wherein capturing the filtered infrared image comprises:
detecting a signal indicating a time at which the first line of the image sensor begins exposure, and
responsive to the delay period elapsing from the detection of the signal, activating the infrared light source, and wherein the camera further comprises an infrared pass filter that passes light having wavelengths in a range between 800 nm and 900 nm and attenuates light having wavelengths outside the range;
detecting one or more eye features in the region of interest of the filtered infrared image; and
determining a point of regard based on the one or more eye features, the point of regard identifying a position on a display at which the eye is looking.

9. The system of claim 8, wherein the signal is a trigger signal from a camera control module.

10. The system of claim 8, wherein the operations further comprise:
determining an activation period based on a number of lines between the beginning line and the ending line; and responsive to the activation period elapsing from the activation of the light source, deactivating the light source.

11. The system of claim 10, wherein determining the activation period comprises determining a period between a time at which the ending line begins exposure and a time at which the beginning line ends exposure.

12. The system of claim 8, wherein the region of interest of the image includes a region of the image depicting an eye and excludes a region of the image depicting at least a portion of a face.

13. The system of claim 8, wherein the region of interest of the image is a region of the image depicting a face.

14. A non-transitory machine-readable storage medium storing instructions which, when executed by one or more processors, cause the one or more processors to perform operations comprising:
   identifying a region of interest of an image to be captured by a camera comprising a rolling shutter image sensor, the image captured by sequentially exposing lines of the image sensor starting with a first line of the image sensor, the region of interest beginning at a beginning line of the image sensor and ending at an ending line of the image sensor and corresponding to a region of the image depicting an eye;
   determining a delay period between a time at which the first line of the image sensor begins exposure and a time at which the ending line begins exposure;
   capturing a filtered infrared image by the camera, wherein capturing the filtered infrared image comprises:
      detecting a signal by a processor of a machine, the signal indicating a time at which the first line of the image sensor begins exposure, and
      responsive to the delay period elapsing from the detection of the signal, activating an infrared light source, and wherein the camera further comprises an infrared pass filter that passes light having wavelengths in a range between 800 nm and 900 nm and attenuates light having wavelengths outside the range;
   detecting one or more eye features in the region of interest of the filtered infrared image; and
   determining a point of regard based on the one or more eye features, the point of regard identifying a position on a display at which the eye is looking.

15. The non-transitory machine-readable storage medium of claim 14, wherein the signal is a trigger signal from a camera control module.

16. The non-transitory machine-readable storage medium of claim 14, wherein the operations further comprise:
   determining an activation period based on a number of lines between the beginning line and the ending line; and
   responsive to the activation period elapsing from the activation of the light source, deactivating the light source.

* * * * *

UNITED STATES PATENT AND TRADEMARK OFFICE
CERTIFICATE OF CORRECTION

PATENT NO. : 9,961,258 B2  
APPLICATION NO. : 15/051188  
DATED : May 1, 2018  
INVENTOR(S) : Martin Henrik Tall Page 1 of 1

It is certified that error appears in the above-identified patent and that said Letters Patent is hereby corrected as shown below:

In the Claims

Column 16, Line 39-40, after "depicting an eye" delete "," and insert -- ; --.
Column 16, Line 43, after "image sensor begins exposure" delete "," and insert -- ; --.
Column 16, Line 50-51, after "activating" delete "the" and insert -- an --.

Signed and Sealed this
Fourth Day of June, 2019

Andrei Iancu
*Director of the United States Patent and Trademark Office*